(12) United States Patent
Van Der Meer et al.

(10) Patent No.: US 12,509,313 B2
(45) Date of Patent: Dec. 30, 2025

(54) DEVICE FOR STORING STANDARDIZED STORAGE GOODS IN A HIGH-BAY WAREHOUSE

(71) Applicant: AMOVA GmbH, Hilchenbach (DE)

(72) Inventors: Ronald Johannes Van Der Meer, The Walk Dubai (AE); Patrick Bol, Dubai (AE); Volker Brück, Mudersbach (DE); Carsten Heide, Netphen (DE); Bernd Klein, Hilchenbach (DE)

(73) Assignee: AMOVA GmbH, Hilchenbach (DE)

( * ) Notice: Subject to any disclaimer, the term of this patent is extended or adjusted under 35 U.S.C. 154(b) by 673 days.

(21) Appl. No.: 17/785,330

(22) PCT Filed: Nov. 9, 2020

(86) PCT No.: PCT/EP2020/081477
§ 371 (c)(1),
(2) Date: Jun. 14, 2022

(87) PCT Pub. No.: WO2021/121775
PCT Pub. Date: Jun. 24, 2021

(65) Prior Publication Data
US 2023/0002175 A1    Jan. 5, 2023

(30) Foreign Application Priority Data
Dec. 16, 2019 (DE) ................ 10 2019 134 527.8

(51) Int. Cl.
B65G 1/04    (2006.01)
B65G 63/00    (2006.01)

(52) U.S. Cl.
CPC ......... B65G 63/004 (2013.01); B65G 1/0471 (2013.01); B65G 1/0492 (2013.01); B65G 2201/0235 (2013.01)

(58) Field of Classification Search
CPC ........................... B65G 1/0471; B65G 63/004
See application file for complete search history.

(56) References Cited

U.S. PATENT DOCUMENTS

| 7,686,559 B2 * | 3/2010 | Tsujimoto | B65G 1/0492 |
| | | | 700/214 |
| 8,827,619 B2 * | 9/2014 | Schafer | B65G 1/1378 |
| | | | 414/268 |
| 12,006,148 B2 * | 6/2024 | Cavelius | B65G 1/0485 |
| 2009/0129902 A1 | 5/2009 | Schafer | |
| 2010/0316469 A1 | 12/2010 | Lert et al. | |
| 2017/0152106 A1 | 6/2017 | Hofmann | |

(Continued)

FOREIGN PATENT DOCUMENTS

| CN | 102167208 A | 8/2011 |
| CN | 108146948 A | 6/2018 |

(Continued)

OTHER PUBLICATIONS

Van Der Meer et al., co-pending U.S. Appl. No. 17/785,375, national phase entry of PCT/EP2020/081478.

(Continued)

*Primary Examiner* — Mark C Hageman
(74) *Attorney, Agent, or Firm* — Smartpat PLC

(57) ABSTRACT

The disclosure relates to a device and a method for storing standardized storage goods in a high-bay warehouse and to the transfer thereof.

21 Claims, 3 Drawing Sheets

(56) References Cited

U.S. PATENT DOCUMENTS

| | | |
|---|---|---|
| 2017/0267452 A1 | 9/2017 | Goren et al. |
| 2020/0102162 A1 | 4/2020 | Wieschemann et al. |
| 2021/0188572 A1 | 6/2021 | Heide et al. |
| 2021/0206569 A1 | 7/2021 | Bretz |
| 2023/0159272 A1* | 5/2023 | Cannon ............... B65G 1/0478 414/277 |

FOREIGN PATENT DOCUMENTS

| | | |
|---|---|---|
| CN | 207434312 U | 6/2018 |
| CN | 110446674 A | 11/2019 |
| CN | 215515224 U | 1/2022 |
| DE | 102006025620 A1 | 11/2007 |
| DE | 102013009340 A1 | 12/2014 |
| DE | 102014111385 A1 | 2/2016 |
| GB | 1192235 A | 5/1970 |
| JP | S4725313 B | 7/1972 |
| JP | S498181 B | 2/1974 |
| JP | 2019104577 A | 6/2019 |
| NO | 20181647 A1 | 12/2019 |
| TW | 201102331 A | 1/2011 |
| WO | 2006136108 A1 | 12/2006 |
| WO | 2007043085 A1 | 4/2007 |
| WO | 2016023869 A2 | 2/2016 |
| WO | 2018167227 A1 | 9/2018 |

OTHER PUBLICATIONS

Japanese Patent Office, Machine Translation of Office Action in related JP patent application 2022536801, retrieved from https://globaldossier.uspto.gov/#/result/application/US/17785375/111040.

Japanese Patent Office, Machine Translation of Office Action in related patent application JP2022536802, retrieved from https://globaldossier.uspto.gov/#/result/application/US/17785330/73261.

* cited by examiner

DEVICE FOR STORING STANDARDIZED STORAGE GOODS IN A HIGH-BAY WAREHOUSE

TECHNICAL FIELD

The disclosure relates to a device for storing standardized storage goods in a high-bay warehouse.

BACKGROUND

For the transfer of standardized storage goods between different transportation means, in particular when transshipping from sea to land, it is necessary to decouple the different flows of storage goods from each other and, if necessary, to store storage goods for a short period of time. Warehouses, in particular high-bay warehouses with corresponding transport devices, are typically used for this purpose. Different transportation means lead the storage goods to and from the high-bay warehouse. For this purpose, autonomous driving transportation means as well as person-operated transportation means may be used.

The standardized storage goods are taken over by a transshipment facility from the transportation means and/or a storage system during storage at an interface of the high-bay warehouse and transferred to an internal warehouse transport system. This transports the standardized storage goods to the respective storage location in the high-bay warehouse. The retrieval process takes place accordingly in reverse order.

The transshipment facilities are typically set up at the outer edges of the high-bay warehouse and form the interface between the internal warehouse transport and the external supply of the standardized storage goods to the high-bay warehouse.

The efficiency of the transfer process of a high-bay warehouse depends on the quantity or necessary time to transfer the standardized storage goods. With the current increase in sea-going vessel capacity and limited space in existing ports, there is a need to further reduce transfer times without increasing the space required for a high-bay warehouse, thus improving cost effectiveness.

The limiting element in previous high-bay warehouses and their modes of operation is the transshipment operation at the outer edges of the high-bay warehouse and the subsequent transport process in the high-bay warehouse. As the size of the high-bay warehouse increases, the storage capacity increases, but the transshipment options at the outer edges do not increase equally. Due to these defined interfaces, in particular in the case of extensive high-bay warehouses, the storage goods must be moved over long distances in the high-bay warehouse by the internal warehouse transport system from or to the transportation means. Furthermore, the transshipment operation at the transshipment facility requires additional time.

SUMMARY

An object of the disclosure is to increase the number of transshipment options in a high-bay warehouse and to shorten the necessary transfer time.

The object is achieved by the features of the device as claimed. The device has at least one horizontal level of transport perpendicular to the movement level of the transport system. The level of transport is traversable by at least one external transportation means and the level of transport is accessible to the external transportation means from at least one side. The transport system of the high-bay warehouse has means with which the storage goods are acquired directly from the external transportation means and/or transferred to the transportation means by means of a vertical movement of the storage goods. Along a line parallel to the level of transport within the movement level of the transport system, the exchange location for transferring the storage goods to the external transportation means supplying or removing the storage goods can be freely positioned. Freely positionable means that the parallel line on which the exchange location is freely positionable has no discrete divisions other than those structurally necessary to define an exchange location. This means that one work step can be completely eliminated, since no additional transshipment facility is required. By no longer transshipping at the outer edges or at points defined in the forefront, the resulting degree of freedom can be used to reduce the distance between the storage location and the exchange location. Changing the line-type interface design to an area interface of the transshipment operation allows for larger high-bay warehouses in terms of floor space without increasing the necessary travel distance between the storage location and the exchange location.

Furthermore, preferred embodiments of the device are shown in the dependent claims. There are preferably more than 2, even more preferably more than 5, very preferably more than 10 movement levels with an associated internal warehouse transport system. As the size of the high-bay warehouse increases, the flexibility created by the device in accordance with the invention can be better utilized to shorten the transfer time.

In a preferred embodiment, within at least 50%, more preferably at least 70%, even more preferably at least 90% of the line congruent with or parallel to the level of transport, the exchange location for transfer of the storage goods to the external transportation means supplying or removing the storage goods can be freely positioned. The greater the degree of freedom for positioning the exchange location along the congruent or parallel line, the more the internal warehouse transport distance between the storage location and the exchange location can be shortened.

Ideally, there are at least two transport systems within one movement level. This allows a plurality of transportation means to be loaded or unloaded at the same time. Alternatively, one transport means can be used to unload a transportation means and then loaded with the second transport means.

The level of transport is preferably traversable by different external transportation means at the same time. This preferred design ensures that different streams of storage goods, which are transported by different transportation means in the high-bay warehouse, are transshipped simultaneously.

Furthermore, it is preferred that the level of transport is traversable by an autonomously driving transport vehicle. This is particularly preferred in seaports, as autonomous driving transport vehicles are increasingly used for transshipping storage goods in seaports. This ensures that storage goods can be stored or retrieved from a common main transportation means.

The level of transport is traversable from a plurality of sides, preferably from opposite sides. This makes it possible for similar transportation means, such as trucks and autonomous transport vehicles, to move on the same level without disrupting the flow of storage goods. It is advantageous if the corresponding lanes or flows of storage goods do not obstruct each other. This is particularly important when autonomous transport vehicles and manually operated transport vehicles meet. Corresponding safety rules and/or traffic regulations are preferably to be observed.

The level of transport is below at least one storage level, preferably all storage levels. Since most transportation means are loaded with storage goods from above, this simplifies the mechanics of the internal warehouse transport system for loading or unloading the storage goods from the transportation means.

The level of transport is ideally connected to an external traffic feeder by at least one ramp and/or terrain cut and the ramp, and/or terrain cut overcomes no more than 1.5 m, preferably no more than 1.0 m, even more preferably no more than 0.5 m in height difference between the level of transport and the external traffic feeder. This has the advantage of simplifying access to the high-bay warehouse for a wide variety of transportation means. In particular when combining, for example, trucks with rail-bound transportation means, this results in simple route management. This is particularly preferable for high-bay warehouses as transfer facilities for maritime trade, since, near the coast, underground structures below the waterline are associated with high costs.

Furthermore, a preferred embodiment is that the high-bay warehouse and the height necessary for the passage of external transportation means are elevated. This has the advantage that a traffic route can be provided underneath the high-bay warehouse, irrespective of the level of transport and an associated traffic feeder. This can be advantageous if the high-bay warehouse is to realize transfer to inland vessels and corresponding connections are to be realized.

Ideally, the traversable route within the level of transport has an entrance or exit route running largely perpendicular to the movement level of the internal warehouse transport system to reach the movement level containing the exchange location and a traversable exchange route along the parallel line of the freely positionable exchange location. This design can reduce the risk of congestion from external transportation means along the parallel line.

Furthermore, it is preferred that the level of transport consists of more than 50%, more preferably more than 70%, even more preferably more than 90% of traversable routes. This will allow even greater throughput of external transportation means with a reduced risk of congestion.

The supply and/or removal of the storage goods by the external transportation means to the exchange location with the internal warehouse transport means takes place within the high-bay warehouse along at least one route in the horizontal level of transport, which is perpendicular to the movement level of the transport system. The transport system acquires and/or transfers the storage goods from the external transportation means by means of a vertical movement of the storage goods. The vertical movement for acquiring and/or transferring the storage goods takes place at the exchange location within a line of the movement level of the transport system that is congruent or parallel to the level of transport, and the exchange location is freely positioned within the congruent or parallel line.

The external transportation means preferably reaches the movement level containing the exchange location by means of an entrance or exit route running as far as possible perpendicularly to the movement level, and the external transportation means reaches the exchange location along the congruent or parallel line by means of a traversable exchange route. This reduces the distance traveled on the exchange route and avoids congestion within the exchange route.

Preferably, different types of external transportation means are used for the supply and removal of the storage goods. A different type of a transportation means in this case means, for example, the combination of rail and road and/or, for example, the combination of manually and autonomously driving vehicles as a transportation means.

Ideally, at least two directions of the flow of storage goods are used for the supply and removal of storage goods to and from the high-bay warehouse. This makes it possible to implement two directions of the flow of storage goods that do not interfere with each other and take into account possible differences in capacity or speed of the various transportation means. Depending on the demand and storage capacity of the high-bay warehouse, the flows of storage goods or the transfer process should be advantageously adjusted to the transportation means.

Autonomous transport vehicles are ideally used for the supply and removal of the storage goods of one direction of the flow of storage goods, and for another direction of the flow of storage goods, semitrailers, preferably trucks, are preferably used for the supply and removal of the storage goods. This makes the process ideally suited to the conditions of existing flows of storage goods in seaports.

Preferably, at least two directions of the flow of storage goods are operated within one level of transport, preferably simultaneously. This simplifies the coordination of the flow of storage goods and the movements of the transport system of the high-bay warehouse. Furthermore, the design of the level of transport is simplified, since no pass-through points for a vertical movement of the storage goods through the level of transport have to be realized.

Furthermore, it is preferred if two directions of the flow of storage goods are operated, preferably simultaneously, along parallel routes in the horizontal level of transport. This simplifies traffic routing within the level of transport compared to, for example, intersecting routes.

Preferably, in the case of a high-bay warehouse in a seaport, one direction of the flow of storage goods is toward the seaward side and the second direction of the flow of storage goods is toward the landward side. This advantageously ensures that the directions of the flow of storage goods take over the conditions of the supra-regional transport directions of the storage goods and do not negatively influence them. Preferably, the external transportation means pass under at least one storage level, preferably all storage levels. The transport system for storage goods within the warehouse can thus easily load and unload the external transportation means, since external transportation means are usually loaded and unloaded from above.

BRIEF DESCRIPTION OF THE DRAWINGS

The description is accompanied by the following four figures.

DETAILED DESCRIPTION

The invention is described in detail below with reference to the above figures in the form of exemplary embodiments. In all figures, the same technical elements are provided with the same reference signs.

Figure 1:
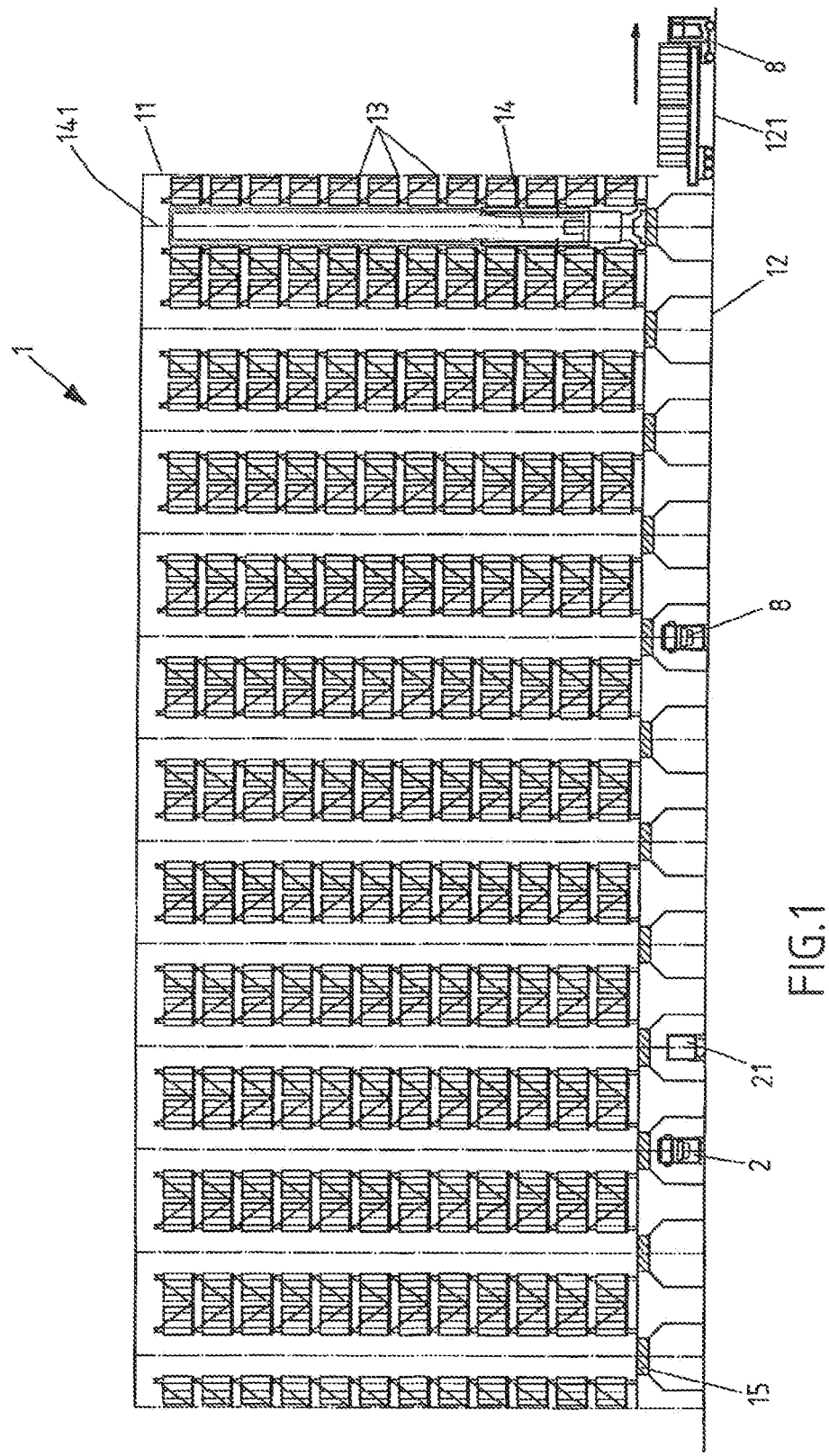
FIG. 1: Side view of a high-bay warehouse.

FIG. 1 shows a section through a high-bay warehouse 1 with a level of transport 12 and 12 storage levels 13 above it. 24 different transport systems 14 move the storage goods 3 within the high-bay warehouse 1 along the storage rows of the high-bay warehouse 11 to the specific storage position of the storage goods 3. Furthermore, the transport systems 14 can acquire or transfer a storage good 3 below the storage levels 13 from a transportation means 2. In such a case, high-bay warehouse 1 is designed to transfer standardized sea containers. Here, level of transport 12 can be reached at ground level by the truck 8 transportation means.

Figure 2:
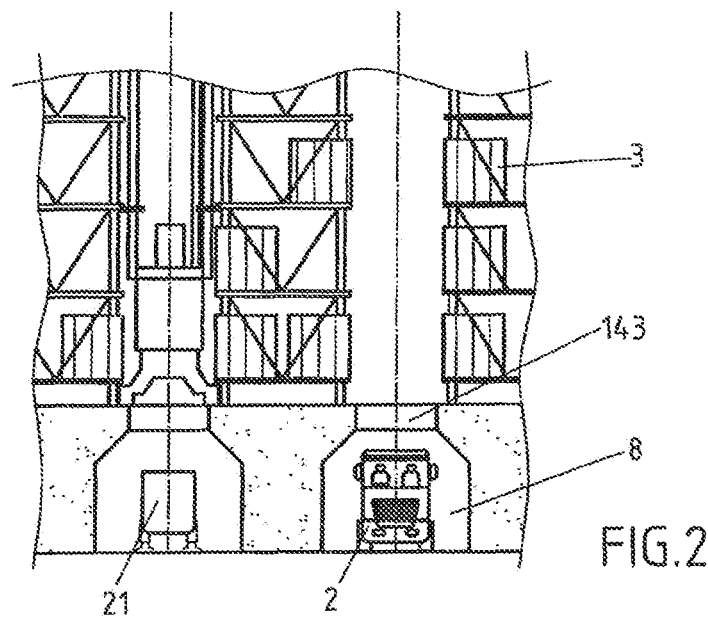
FIG. 2: Loading and unloading of a truck.

FIG. 2 shows a section of a high-bay warehouse 1 of FIG. 1. A part of the level of transport 12, the three storage levels 13 above it and a transport system 14 arranged between two rows of storage are illustrated. For example, the transport system 14 can remove a container 3 from a truck 8 located below by moving it vertically and then store it at a corresponding position in the high-bay rack 11. By designing the level of transport 12 accordingly, for example in terms of width and height, it can be traversable for different transportation means 2. This must be observed in particular if rail-bound transportation means 21 are to be used.

Figure 3:
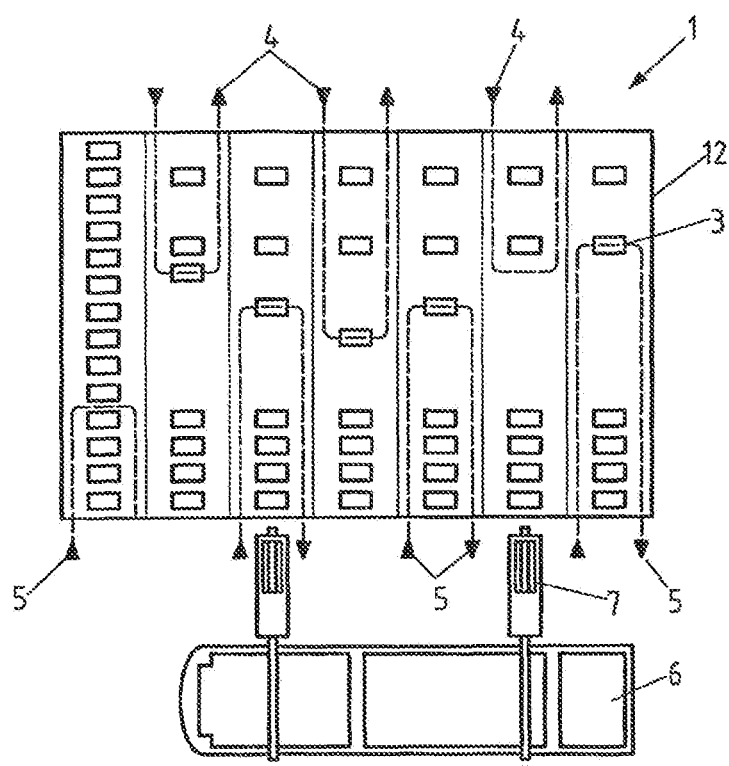
FIG. 3: Directions of the flow of loading and possible transfer positions.

FIG. 3 shows a schematic sketch of the directions of the flow of storage goods 4, 5 in a high-bay warehouse 1. Containers 3 are unloaded from a sea-going vessel 6 by means of an unloading crane 7 and loaded onto an ideally autonomously moving transportation means 2. These traverse into the high-bay warehouse 1 from the seaward side, transfer a container 3 to a transport system 14 of the high-bay warehouse 1, for example, and leave the high-bay warehouse 1 again in the direction of the seaward side. In the opposite direction, trucks 8, for example, traverse on the same level of transport 12 from the landward side. The trucks 8 travel to a previously defined exchange location 143 or pass-through point 15 within the level of transport 12 of the high-bay warehouse 1, and the transport system 14 transfers a container 3 from the high-bay warehouse 1 to a truck 8 at such location. This then leaves the high-bay warehouse 1 again towards the landward side. The pass-through point 15 can vary within the level of transport 12 for each of the traffic means 2, 21, 8 involved. This results in a two-dimensional interface design in the level of transport 12 for the transfer of the storage goods 3 to the transport systems 14, compared to a previous linear interface design at the outer edges of the high-bay warehouse 1.

Figure 4:
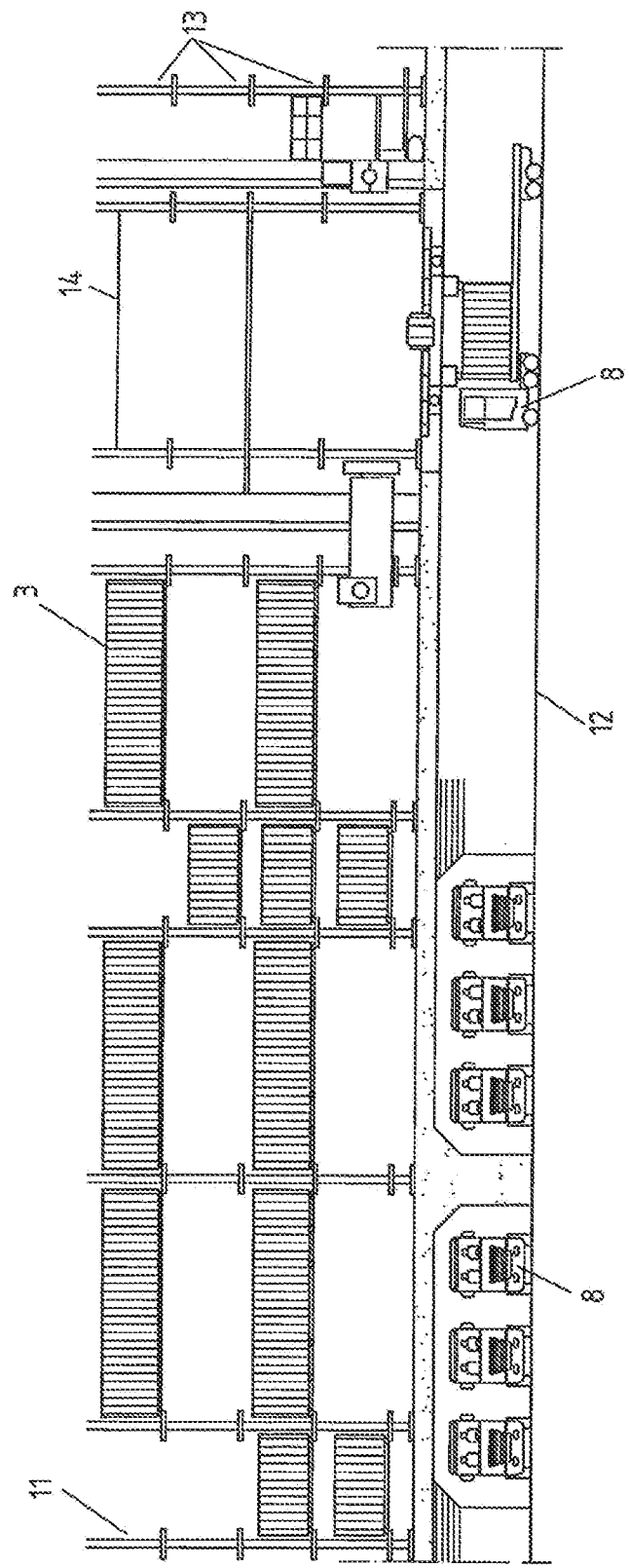
FIG. 4: Level of transport and adjacent storage levels.

As shown in FIG. 4, an appropriately configured level of transport 12 can allow a traversable route to also be an exchange location 143. Here, three trucks 8 can drive parallel to each other. If, on the other hand, the truck 8 is standing vertically within the traversable route, it can be loaded or unloaded by the transport system 14.

REFERENCE SIGNS

| Number | Description |
| --- | --- |
| 1 | High-bay warehouse |
| 11 | High-bay rack |
| 12 | Level of transport |
| 13 | Storage levels |
| 14 | Transport system |
| 143 | Exchange location |
| 2 | Transportation means |
| 21 | Rail-bound transportation means |
| 3 | Storage goods |
| 4 | Landward side flow of storage goods |
| 5 | Seaward side flow of storage goods |
| 6 | Sea-going vessel |
| 7 | Unloading crane |
| 8 | Truck |
| 141 | Movement level |
| 121 | Entrance/exit route |
| 15 | Pass-through point |

The invention claimed is:

1. A high-bay warehouse (1) for storing storage goods (3), comprising:
   a high-bay rack (11) for storing the storage goods (3);
   an internal warehouse transport system (14) for storing and retrieving the storage goods (3) from the high-bay rack (11), for transporting the storage goods (3) horizontally and vertically in a movement plane (141) parallel to the high-bay rack (11) and for transferring the storage goods (3) at an exchange location (143) to transport vehicles (2) supplying or removing the storage goods (3) from the high-bay warehouse;
   a horizontal level of transport (12) that is perpendicular to the movement plane (141) of the internal warehouse transport system (14) and can be described by an x, y coordinate system; and
   a traversable route that can be traversed by the transport vehicles (2) in the horizontal level of transport (12), the traversable route extending at least partially parallel to the movement plane (141) and intersecting the movement plane (141) at the exchange location (143),
   wherein the horizontal level of transport (12) is accessible from at least one side for the transport vehicles (2),
   wherein the internal warehouse transport system (14) is configured to acquire the storage goods (3) from the transport vehicles (2) and transfer the storage goods (3) to the transport vehicles (2) by a vertical movement of the storage goods (3) anywhere along the traversable route, and
   wherein the exchange location (143) can be freely positioned within the movement plane (141) of the internal warehouse transport system (14).

2. The high-bay warehouse (1) according to claim 1, wherein the movement plane (141) is one of more than ten movement planes (141), each having an associated transport system (14).

3. The high-bay warehouse (1) according to claim 1, wherein the exchange location (143) can be freely positioned within at least 90% of a horizontal travel range of the internal warehouse transport system (14).

4. The high-bay warehouse (1) according to claim 1, wherein at least two transport systems (14) are present within the movement plane (141).

5. The high-bay warehouse (1) according to claim 1, wherein the horizontal level of transport (12) can be traversed simultaneously by different transport vehicles (2).

6. The high-bay warehouse (1) according to claim 1, wherein the horizontal level of transport (12) can be traversed by autonomously driving transport vehicles.

7. The high-bay warehouse (1) according to claim 1, wherein the horizontal level of transport (12) can be traversed by a truck.

8. The high-bay warehouse (1) according to claim 1, wherein the horizontal level of transport (12) can be traversed from opposite sides of the high-bay warehouse (1).

9. The high-bay warehouse (1) according to claim 1, wherein the high-bay rack (11) includes a plurality of storage levels (13) for storing the storage goods (3), and wherein the horizontal level of transport (12) lies below the storage levels (13).

10. The high-bay warehouse (1) according to claim 1, wherein the horizontal level of transport (12) is connected by at least one ramp and/or a terrain cut with an external traffic feeder, and wherein the ramp or terrain cut does not exceed 0.5 m in height difference.

11. The high-bay warehouse (1) according to claim 1, wherein the high-bay rack (11) is elevated to allow passage of the transport vehicles (2) thereunder.

12. The high-bay warehouse (1) according to claim 1, wherein the horizontal level of transport (12) consists of more than 90% of traversable routes.

13. A method for storing standardized storage goods (3) in a high-bay warehouse (1), comprising:
providing the high-bay warehouse (1) according to claim 1;
effecting a supply and/or removal of the storage goods (3) by the transport vehicles (2) to the exchange location within the high-bay warehouse (1) along a route in the horizontal level of transport (12) that is perpendicular to the movement plane (141) of the internal warehouse transport system (14); and
acquiring and/or transferring, with the internal warehouse transport system (14), the storage goods (3) from the transport vehicles (2) by a vertical movement of the storage goods (3),
wherein the route of the transport vehicles (2) extends at least partially parallel to the movement plane (141) and intersects the movement plane (141) at an exchange location (143), and
wherein the exchange location (143) is freely positioned along the route.

14. The method according to according to claim 13, wherein different types of transport vehicles (2) are used for the supply and removal of the storage goods (3).

15. The method according to according to claim 13, wherein at least two directions of flow of storage goods (4,5) are used for the supply and removal of the storage goods (3) into the high-bay warehouse (1).

16. The method according to according to claim 15, wherein the at least two directions of the flow of storage goods (4,5) are operated within one level of transport (12).

17. The method according to according to claim 15, wherein the at least two directions of the flow of storage goods (4, 5) are operated along parallel entrance or exit routes (121) in the horizontal level of transport (12).

18. The method according to according to claim 15, wherein the high-bay warehouse is arranged in a seaport, and
wherein one of the at least two directions of the flow of storage goods (5) is toward a seaward side and another one of the at least two directions of the flow of storage goods (4) is toward a landward side.

19. The method according to according to claim 13, wherein autonomous transport vehicles are used for the supply and removal of the storage goods (3) in at least one direction of a flow of storage goods (4, 5).

20. The method according to according to claim 13, wherein semitrailer trucks are used for delivering and removing of the storage goods (3) in at least one direction of a flow of storage goods (4, 5).

21. The method according to according to claim 13, wherein the transport vehicles (2) pass at least partially under the high-bay warehouse (1) for the supply and removal of the storage goods (6).

* * * * *